United States Patent
Hull et al.

(10) Patent No.: US 6,656,410 B2
(45) Date of Patent: Dec. 2, 2003

(54) RECOATING SYSTEM FOR USING HIGH VISCOSITY BUILD MATERIALS IN SOLID FREEFORM FABRICATION

(75) Inventors: Charles W. Hull, Santa Clarita, CA (US); Kenneth J. Newell, Valencia, CA (US)

(73) Assignee: 3D Systems, Inc., Valencia, CA (US)

( * ) Notice: Subject to any disclaimer, the term of this patent is extended or adjusted under 35 U.S.C. 154(b) by 100 days.

(21) Appl. No.: 10/052,506

(22) Filed: Jan. 17, 2002

(65) Prior Publication Data

US 2002/0195747 A1 Dec. 26, 2002

Related U.S. Application Data (63) Continuation-in-part of application No. 09/887,174, filed on Jun. 22, 2001, now abandoned.

(51) Int. Cl.$^7$ .......................... B29C 35/08; B29C 41/02
(52) U.S. Cl. ................ 264/401; 264/113; 264/234; 264/308; 425/78; 425/174.4; 425/404
(58) Field of Search .............................. 264/113, 234, 264/308, 401; 425/78, 174.4, 404

(56) References Cited

U.S. PATENT DOCUMENTS

| | | |
|---|---|---|
| 3,264,103 A | 8/1966 | Cohen et al. |
| 3,395,014 A | 7/1968 | Cohen et al. |
| 5,096,530 A | 3/1992 | Cohen |
| 5,234,636 A | 8/1993 | Hull et al. |
| 5,358,673 A | 10/1994 | Heller et al. |
| 5,447,822 A | 9/1995 | Hull et al. |
| 5,474,719 A | 12/1995 | Fan et al. |
| 5,626,919 A | 5/1997 | Chapman et al. |
| 5,651,934 A | 7/1997 | Almquist et al. |
| 5,688,464 A | 11/1997 | Jacobs et al. |
| 5,891,382 A | 4/1999 | Almquist et al. |
| 5,922,364 A | 7/1999 | Young, Jr. |
| 6,020,508 A | 2/2000 | Nikolic et al. |
| 6,048,487 A | 4/2000 | Almquist et al. |
| 6,174,156 B1 | 1/2001 | Chapman et al. |
| 6,180,188 B1 | 1/2001 | Belleville et al. |

FOREIGN PATENT DOCUMENTS

| | | |
|---|---|---|
| WO | 00/51809 A1 | 9/2000 |

*Primary Examiner*—Leo B. Tentoni
(74) *Attorney, Agent, or Firm*—Ralph D'Alessandro; James E. Curry (57) ABSTRACT

A method of applying highly viscous paste-like build materials in layers in a solid freeform fabrication apparatus to form three-dimensional objects. A viscosity modifier is first introduced into the build material to establish a low viscosity state and then the material is dispensed in layers on a working surface. The viscosity modifier is then removed from the build material preferably by evaporation, and the layer is selectively solidified to form the three-dimensional object. The method substantially eliminates the undesirable effects of induced shear stress imposed on lower layers when attempting to apply uniform layers of highly viscous materials in solid freeform fabrication techniques. The method allows for the use of highly viscous paste-like materials that can include upwards of 50% by weight of metallic, ceramic, mineral, or polymer powders. Preferably the binder is a photocurable resin or thermocurable material which is selectively solidified to form the three-dimensional objects.

96 Claims, 4 Drawing Sheets

RECOATING SYSTEM FOR USING HIGH VISCOSITY BUILD MATERIALS IN SOLID FREEFORM FABRICATION

This application is a continuation-in-part of application Ser. No. 09/887,174 filed Jun. 22, 2001, now abandoned.

BACKGROUND OF THE INVENTION

1. Field of the Invention

The invention relates in general to a recoating system for use by any solid freeform fabrication technique and, in particular, to a recoating system capable of establishing a uniform layer of a high viscosity build material prior to being solidified by a solid freeform fabrication apparatus. The recoating system is unique in that previously formed layers are not substantially disturbed when applying a new layer of build material to establish a layer of high viscosity build material.

2. Description of the Prior Art

Recently, several new technologies have been developed for the rapid creation of models, prototypes, and parts for limited run manufacturing. These new technologies can generally be described as Solid Freeform Fabrication techniques, herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, selective laser sintering, and the like. Generally in SFF techniques, complex parts are produced from a modeling material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques incrementally add portions of a build material to specific locations, layer by layer, in order to build a complex part. The additive process varies depending on the technique used, whether by selective deposition of a build material or by selective solidification of a build material.

SFF technologies typically utilize a computer graphic representation of a part and a supply of a build material to fabricate the part in successive layers. SFF technologies have many advantages over the prior conventional manufacturing methods. For instance, SFF technologies dramatically shorten the time to develop prototype parts and can quickly produce limited numbers of parts in rapid manufacturing processes. They also eliminate the need for complex tooling and machining associated with-the prior conventional manufacturing methods, including the need to create molds in casting operations. In addition, SFF technologies are advantageous because customized objects can be produced quickly by processing computer graphic data.

There are a wide variety of build materials that are used in various SEE techniques. These materials are typically applied in the form of a powder, liquid, paste, foam, or gel. Recently, there has developed an interest in utilizing highly viscous paste materials in SEE processes. One of the main purposes of using paste materials is to take advantage of their unique material properties which result in improved properties of the resultant parts formed. These pastes may be obtained by blending a solid charge or filler material in the form of a particulate or powder with a bonding agent. For some pastes the bonding agent is comprised of a photosensitive or heat-cured liquid resin, such as a photopolymerizable resin composed of various combinations of acrylates, epoxies, and vinyl ethers. The powders, typically having a particle size of less than 45 $\mu$m, may be a polymer, mineral, metallic, ceramic, or any combination thereof. Some polymer powders that may be used are thermoplastics such as ABS, Nylon, polypropylene, polycarbonate, polyethersulfate, and the like. Some metallic powders that may be used are steel, steel alloy, stainless steel, aluminum, aluminum alloy, titanium, titanium alloy, copper, tungsten, tungsten carbide, molybdenum, nickel alloy, lanthanum, hafnium, tantalum, rhenium, rubidium, bismuth, cadmium, indium, tin, zinc, cobalt, manganese, chromium, gold, silver, and the like. Some ceramics that may be used are aluminum nitride, aluminum oxide, calcium carbonate, fluoride, magnesium oxide, silicon carbide, silicon dioxide, silicon nitride, titanium carbide, titanium earbonitride, titanium diboride, titanium dioxide, tungsten carbide, tungsten trioxide, zirconia, and zinc suiphide, and the like. Some rare earth mineral powders thai may be used are cerium oxide, dysprosium oxide, erbium oxide, gadolinium oxide, holmium oxide, lutetium oxide, samarium oxide, terbium oxide, yttrium oxide, and the like. Alternatively, these pastes may also be obtained by blending high viscosity photosensitive or heat-cured liquid resins without a solid charge of filler material, These high viscosity liquids or pastes can be obtained by blending, for example, photopolymerizable resins composed of acrylates, epoxies, and/or vinyl ethers wit any desired toughening agent, such as, for example, polybutadiene, polyethylene, fiberglass, and the like.

The pastes, typically having a viscosity of greater than 10,000 centipoise at ambient conditions, are selectively cured layer by layer by exposure to radiation. Generally, the radiation cures the bonding agent in the paste. The uncured pastes may exhibit a linear stress-strain relationship, a Bingham type linear stress-strain relationship having a threshold yield stress to overcome, a non-linear pseudoplastic stress-strain relationship (shear thinning), or a non-linear dilatant fluid stress-strain relationship (shear thickening). It has been discovered that pastes have significant advantages over other materials used in SFF techniques. For example, the pastes can contain concentrations of a solid charge material, such as a metallic powder, of greater than 50% by volume, which in turn can produce extremely dense green parts. These green parts are well suited for further post processing, such as sintering and infiltration, to produce mechanical properties in the resultant parts that are substantially similar to those achieved by conventional forming techniques such as casting or forging. Thus, it is believed that the utilization of pastes is a significant step forward in achieving rapid manufacturing by solid freeform fabrication techniques.

Recently, there has also developed an interest in utilizing highly viscous liquid materials in SFF processes. For example, in stereolithography a liquid photopolymer resin is used comprising both high and low molecular weight monomers and oligomers. When solidified, the high molecular weight monomers and oligomers provide greater mechanical properties in the resultant objects than the low molecular weight monomers. Thus, it is desirable to maximize the quantity of high molecular weight monomers and oligomers in the resin in order to increase the mechanical properties of the parts formed, and/or include toughening agents to increase the properties. However, when the quantity of high molecular weight monomers and oligomers are increased in a liquid photopolymer resin, the viscosity of resin is also increased. Undesirably, the increase can far exceed the acceptable viscosity range of the resin coating system, since most conventional stereolithography resin coating systems are generally able to work only with low viscosity liquid resins whose behavior is similar to that of a Newtonian liquid. In order to compensate for this, current liquid photopolymer resins used in stereolithography include low molecular weight monomers so as keep the viscosity of the resin within the acceptable viscosity range of the resin coating system. Thus, there is a need to be able to work with high viscosity liquids in order to substantially enhance the mechanical properties of objects formed from liquid photopolymer resins used in stereolithography.

There are number of difficulties that must be overcome when working with high viscosity pastes and liquids in SFF techniques. For example, in order to make a highly viscous material flow, the material must be subjected to a significant amount of shear stress. When attempting to form a uniform layer of a highly viscous material in SFF, the recoater or spreading device invariably induces a significant amount of shear stress on the material. When forming a new layer, the induced shear stress also acts on previously formed layers and can cause the layers of the part to deform, curl, or shift. For highly viscous materials this can undesirably result in de-lamination between layers, missing portions of layers, uneven coating of layers, and the like. In addition, the shear stress induced by the recoater is also problematic in regions before and after the recoater encounters solidified portions of the part being built, such as in regions of "trapped volumes" and other part features. Some previous attempts to solve the problem have focused on controlling the application of shear forces on the material during the coating process. For example, the recoating system in WO 00/51809 utilizes rotating roller members to control the shear forces induced when applying a layer of highly viscous build material. However, highly viscous liquids and pastes are extremely sensitive to the amount of shear stress necessary to properly form a uniform layer, and the proper amount of shear stress to be applied will vary substantially depending on the particular formulation being used. Often, it is necessary to provide a significant number of attachment supports to not only connect the part to the build platform, but also to keep the layers of the part from moving and distorting during the building process. Thus, the use of highly viscous materials in SFF processes is severely limited by current recoating systems.

Another approach to the problem is disclosed in U.S. Pat. No. 5,474,719 to Fan et al. where it is proposed to formulate a viscosity reducible composition. These compositions reduce in viscosity when they are heated, or when a shear stress is applied. Compositions whose viscosity reduces when shear stress is applied are generally known as pseudoplastic fluids or shear thinning fluids which do not encompass the entire rheological range of paste formulations available. Thus, U.S. Pat. No. 5,474,719 to Fan et al. suggests formulating heat liquifable plastic flow compositions and applying them in a heated liquid state, or formulating Bingham type compositions that exhibit shear thinning characteristics and inducing a shear stress to the composition during coating. However, both of these solutions limit the rheological range of materials that can be used. For example, pseudoplastic compositions require special formulation which cannot be achieved for all paste formulations. In addition, because the behavior of paste formulations when subjected to a specific amount of applied shear stress varies, it is extremely difficult to configure a specific shear inducing applicator to work satisfactorily for more than one formulation. Thus, there is a need to provide a better solution to the problem of coating high viscosity materials in SFF techniques, one that does not place undesirable rheological limitations on the material formulations to satisfy coating requirements, or require constant adjustments to the coating applicator.

Also, somewhat pertinent to the present invention are the processes disclosed in U.S. Pat. Nos. 3,264,103 and 3,395,014 to Cohen et. al, developed in the field of tape casting. In these patents, processes are disclosed in which a thermoplastic photohardenable composition is applied, in thin layers as a solution, to a film and then allowed to dry. This coated film is then exposed with UV or visible light imagewise from the film side thereby cross-linking the exposed portions. However, these processes are directed primarily toward the production of printing plates, where the composition is applied on top of a stationary layer of film, and does not address the problem of dispensing over a non-stationary layer of flowable material, such as a paste or thixotropic material, without damaging the non-stationary layer below by shear stresses induced during recoating. A more recent example of tape casting utilizing an evaporative solution is U.S. Pat. No. 6,180,188 to Belleville et al. disclosing optical coatings on stationary surfaces.

Photohardenable compositions present a further problem when attempting to achieve high packing densities in filled materials since the photoinitiated reaction employs ultraviolet (UV) light. Where metals are used as the filler material, such as in the production of a metallic part or a metal tooling part, for example, an aluminum part, the UV light will be attenuated by absorption into the metal filled material or by reflection off of the metal filler. This will preclude the binder from hardening throughout the layer of material. Layers, for example, can be 50 microns in thickness so the depth of cure must be greater than the thickness of the material layer to bond with the underlying material. However, high packing densities of metallic filled binder materials can employ bi- and tri-modal metal particles. These particles will effectively act as blocking agents for the transmission of UV light and thereby prevent the layer to layer boundaries of the part from being completely bonded together.

These and other difficulties of the prior art have been overcome according to the present invention by using a viscosity modified build material to build a three-dimensional object in a layerwise fashion.

BRIEF SUMMARY OF THE INVENTION

The present invention provides its benefits across a broad spectrum of SFF processes by providing the ability to establish uniform layers of a high viscosity build material that solidify via latent polymerization in order to build a three-dimensional object in a layerwise fashion with enhanced mechanical properties.

It is one aspect of the present invention to provide a new method of building a three-dimensional object by SFF that is able to establish uniform layers of a highly viscous build material that overcomes the above-mentioned disadvantages of the prior art.

It is another aspect of the present invention to provide a new method of applying a coating of build material that eliminates the material constraints imposed by current recoating systems and is capable of forming uniform layers of the build material for a greater rheological range of build materials for use in SFF.

It is a feature of the present invention that the build material is transformed by the SFF apparatus in three separate phase states.

It is another feature of the present invention to introduce a viscosity modifier in the build material to significantly reduce the viscosity of the material prior to dispensing the material on a working surface.

It is still another feature of the present invention to significantly increase the viscosity of the material by extracting the viscosity modifier from the build material after dispensing the material on a working surface.

It is still yet another feature of the present invention to extract the viscosity modifier from the build material by providing thermal or heat energy to the material to evaporate the viscosity modifier.

It is an advantage of the present invention that the part being built becomes substantially self-supporting and is not substantially affected by the recoating process due to the modifier induced viscosity reduction of the build material during the recoating process.

It is another advantage of the present invention that the need for supports is substantially eliminated thereby greatly improving the downfacing surfaces of the objects formed and minimizing the need for post-finishing.

It is yet another advantage of the present invention method and apparatus that highly filled dense green parts can be formed from paste-like build materials in SFF for rapid manufacturing.

These and other aspects, features, and advantages are achieved/attained in the method and apparatus of the present invention that employs a build material that is applied by a recoating system in a low viscosity state to a working surface to form a layer of build material having a first viscosity value. The method and apparatus transforms the layer of build material from the low viscosity state to a high viscosity state having a second viscosity value. Preferably the transformation is accomplished by removing a viscosity modifier from the layer of build material by applying thermal heat to evaporate the viscosity modifier. In one embodiment, the first viscosity value of the build material is less than at least one-half of the second viscosity value. In another embodiment, the transformation from the low viscosity state to the high viscosity state is of an amount sufficient that when applying another layer of the build material in the low viscosity state over the layer of build material in the high viscosity state, the transference of shear stress to the layer of build material in the high viscosity state is substantially prevented. In another embodiment, the transformation from the low viscosity state to the high viscosity state is such that the second viscosity value of the build material is raised at least to a point where the build material in the layer is substantially self-supporting.

A build material for use in the present invention comprises a combination of a solid charge or filler material and a binder material that forms a paste having a viscosity of approximately greater than 10,000 centipoise at ambient conditions. The solid charge or particulate matter is preferably a powder material selected from any combination of polymer, metal, ceramic, or mineral particles. The average diameter particle size may vary but is preferably approximately less than about 45 $\mu$m. The bonding agent or binder is preferably a photosensitive liquid resin, formulated from an acrylic, epoxy, and/or vinyl ether photopolymerizable based resin, or combination thereof, or a thermally polymerizable material.

The viscosity modifier that is introduced into the build material is preferably a solvent such as an acetone or alcohol which can be removed after being dispensed by evaporation. The staging area wherein the layers are formed may be heated in order to assist or speed up the evaporation process.

In one embodiment, the viscosity modified build material is extruded vertically to a dispensing platform wherein a smoothing member or doctor blade spreads the material over a working surface which may be a previously formed layer or the platform of the SFF apparatus. In an alternative embodiment, the viscosity modified build material is gravity fed to a recoating applicator having a distribution roller, guide blade, skive, and doctor blade. The recoating applicator having the distribution roller is desirable for use with build materials that exhibit liquid-like properties when in the low viscosity state.

Further embodiments include multiple recoating applicators that dispense different build material formulations. In these embodiments multiple layers of different materials such as highly filled metal layers and highly filled ceramic layers can be formed on a three-dimensional object. In addition, these highly filled three-dimensional objects produced by the method and apparatus of the present invention are well suited for further processing, such as sintering and infiltration.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common to the figures.

DETAILED DESCRIPTION OF THE PREFERRED EMBODIMENTS

The present invention provides its benefits across a broad spectrum of SFF processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

The method of the present invention provides the ability of an SFF apparatus to work with a build material that transitions between three separate phase states. More specifically, the principle of the present invention is to reduce the viscosity of a highly viscous build material by introducing a viscosity modifier into the material to establish a first phase state having a first viscosity value, then to apply the thinned material on the working surface of the SFF apparatus, and then to establish a second phase state by removing the viscosity modifier to establish a second viscosity value. The third phase state is a solidified state initiated by selectively solidifying portions of the layer of build material in the second phase state. Solidification is preferably accomplished by exposure to radiation such as, for example, by exposure to actinic radiation produced by a laser and directed by a scanning mirror system, or other radiation that initiates latent polymerization in response to light or heat. The second phase state is a high viscosity state indicative of the original build material formulation. The high viscosity state of the build material may be a highly viscous liquid, semi-solid, gel, foam, or paste. In one embodiment the viscosity is raised to the second viscosity value at least to a point where the build material in the layer is substantially self-supporting. As used herein, a material that is substantially self-supporting is one that is able to hold its own shape under its own weight and is preferably able to do so when present in successive layers without containment walls. For example, all semi-solids, gels, foams, and pastes are substantially self-supporting. Also, many high viscosity liquids are substantially self-supporting due to their thixotropic-type properties, and are particularly so when laid out in thin layers in SFF processes. In another embodiment, the viscosity is raised to the second viscosity value such that the first viscosity value is at least less than about one-half of the viscosity of the second phase state. In the preferred embodiment, the transformation of the viscosity of the build material is accomplished in an amount sufficient that when applying another layer of the build material in the low viscosity state over a layer of build material in the high viscosity state, the transference of shear stress to the layer of build material in the high viscosity state is substantially prevented. Alternatively, the transformation may be accomplished by inducing a chemical transformation on the layer of build material.

Preferably the viscosity modifier or agent is a solvent. The layers of thinned build material are applied with a doctor blade or other smoothing member, and the solvent is removed by evaporation to preferably leave layers of a high viscosity build material on the working surface. Alternatively a solvent extraction process may be used to remove the solvent, if desired. The third phase state of the material is established when the layer of material is selectively solidified by the SFF apparatus to form the three-dimensional object comprised of build material in the third phase state. The three-dimensional object may then be separated from the un-solidified build material surrounding the object. While in the first phase state, the recoating system dispenses the build material on top of previously dispensed material that is in either the second or third phase state or both. The viscosity of the first phase state is substantially reduced compared to the viscosity of the second and third phase states such that problems normally associated with dispensing higher viscosity materials are substantially eliminated.

In a preferred embodiment which has been selected for purposes of illustration, a paste build material consisting of a multi-functional acrylate monomer liquid and a thennal initiator or a photoinitiator, is filled wit silica powder having a viscosity over 100,000 centipoise at ambient conditions. This paste is then thinned with a viscosity modifier such as MEK (methyl ethel keytone), about 30% by volume, to reduce the viscosity to under 10,000 centipoise at ambient conditions. Preferably the viscosity modified build material exhibits liquid-like properties even with the presence of solid particulate matter such as a powder. Suitable solvents that may be used as viscosity modifiers are hydrocarbons, aliphatic hydrocarbons, naphtha, mineral oil, aromatic hydrocarbons, benzene, toluene, functional aromatics, O-Cresol, halogenated hydrocarbons, chlorinated solvents, carbon tetrachloride, carbon dioxide, freon, methylene chloride, monohydric alcohols, polyhydric alcohols, phenols, ethers, tetrahydrofrram glycol ethers, ketones, acetone, cyclohexanone, acetophenone, amines, n-Butylamine, N,N-Dimethylaniline, acids, chromic acids, nitric acids, phosphoric acids, inorganics, water, silicon tetrachioride, phosphoric trichioride, esters, N-Butyl acetate, ethyl acetate, nitrogen-containing compounds, nitrates, nitrites, organic sulfur compounds, acids/aldehydes, acetic acid, trichloroacetic acid, hydroxide bases, ammonium hydroxide, sodium hydroxide, peroxides, hydrogen peroxide, and combinations thereof.

An example of a material useful in achieving latent polymerization is an epoxy with a protected amine group that decomposes in response to light or heat. Thermal polymerization is achieved by use of an appropriate thermal initiator, such as peroxide based initiators. WAZO materials available from E. I. du Pont de Nemours & Company are examples of one type of suitable thermal initiators. Thermal initiators are activated by exposure to infrared (IR) radiation. Other thermal initiators are Azo-bis-isobutyronitrile thermal initiators also are available commercially from Electron Microscopy Sciences of Fort Washington, Pa. and Azo initiators VA-044, VA-057, VA-085, VA-070 and VA-096 are available from Wako Specialty Chemicals, Ltd.

Thermal initiators to achieve thermal curing have also employed salts that are suppliers of cations which initiate cationic curing upon heating. Onium and pyridinium salts provide cationic species that will initiate thermal curing in epoxide compounds, such as compounds based on styrene oxide moieties linked to organic molecules, oligomers or polymers. N-benzylpyridinium and related quaternary ammonium salts provide acidic species under heating conditions. Key in achieving successful thermal initiation of curing is that the linked moieties do not hinder the cationic polymerization of the epoxy functionality by steric interaction or the action of a Lewis base. Such reactions are discussed in greater detail in U.S. Pat. No. 6,020,508 issued Feb. 1, 2000. Other routes capable of liberating cationic species that will achieve the ring-opening polymerization of styrene oxides are also known.

It has also been discovered that it is preferred to include a higher molecular weight tackifier in the build material. The tackifier is added to improve the film strength between the layers, which has also been found to eliminate curl and delamination problems. The tackifier provides a higher apparent viscosity to the build material and improves the film strength of the material. Preferably the tackifier is a polymethyl methacrylate in the form of a powder that dissolves in the presence of a solvent selected as the viscosity modifier, although other tackifiers could be used, if desired. In an alternate embodiment to the build material discussed above, 15% by weight of a high molecular weight polymethyl methacrylate was used in the multi-functional acrylate monomer liquid component of the build material. Two suitable polymethyl methacrylates are sold under the tradenames Elvacite® 2042, and Elvacite® 2043, and are available from ICI Acrylics of Wilmington, Del. Elvacite® is a registered trademark owned by E. I. Du Pont De Nemours & Co., of Wilmington, Del. These polymethyl methacrylates, when used in the build material in about 15% by weight, substantially increased the film strength between layers and eliminated curl problems on the edges of solidified layers.

Referring particularly to the FIGS. 2 through 7 there is illustrated generally at 10 a solid freeform fabrication apparatus for purposes of demonstrating the steps of the present invention recoating system. The viscosity modified build material 12 is placed in a dispensing container 14 that is dispensed by any suitable means, such as by a piston 16 when it is necessary to deliver the material to be distributed by a smoothing member such as a doctor blade 18. The doctor blade 18 reciprocates on a rail system identified by numeral 20, for dispensing the viscosity modified build material 12. Preferably the viscosity modified build material 12 is kept relatively cool and contained so that the modifier does not evaporate quickly. Depending on the composition of the viscosity modified build material, it may be necessary to agitate or circulate the material in the container in order to keep the particles in suspension. The build material may be delivered to the apparatus with the viscosity modifier already added, or alternatively, the viscosity modifier may be mixed with the build material on the fly by the apparatus, if desired, on an as needed basis.

Shown generally by numeral 22 is a staging area of the SFF apparatus 10 where three-dimensional objects are built. The staging area 22 has a build platform 24 which can be raised and lowered by the computer control system (not shown). In FIGS. 2 through 7, three previously formed layers of build material are shown by numerals 26, 28, and 30 respectively. Each of these three previously formed layers have portions of build material existing in the second phase state as indicated by numeral 32, and portions in the third phase state, as indicated by numeral 34. Preferably the second phase state of the build material is substantially self-supporting, typically having a viscosity over 10,000 centipoise at ambient conditions which is established after the modifier is removed by evaporation. The third phase state is a generally solidified state established when the build material is exposed to an appropriate radiation source. The preferred approach is to use an actinic radiation source 36, such as a laser, that is selectively directed via scanning mirrors 38 to solidify the portions of build material in the layers of the three-dimensional object being built, as indicated by numeral 34. A variety of methods of solidifying build material is well known in the art, such as by the selective focus of a UV beam of energy or by masking and flood exposure to radiation.

The staging area 22 is desirably a relatively hot region so as to promote the evaporative process once the viscosity modified build material 12 is dispensed to form a layer. Heater units, shown by numerals 40 and 42, may be used to control the temperature in the staging area 22. Alternatively, heater units may also be placed on the platform 24, or overhead lamps may be provided to control the temperature in the staging area, if desired. In addition, convection heaters may be provided to direct a controlled flow of heated gas or air evenly over each layer to promote the evaporation process in order to achieve a desirable evaporation rate that is acceptable for the SFF apparatus to build three-dimensional objects.

Figure 2:
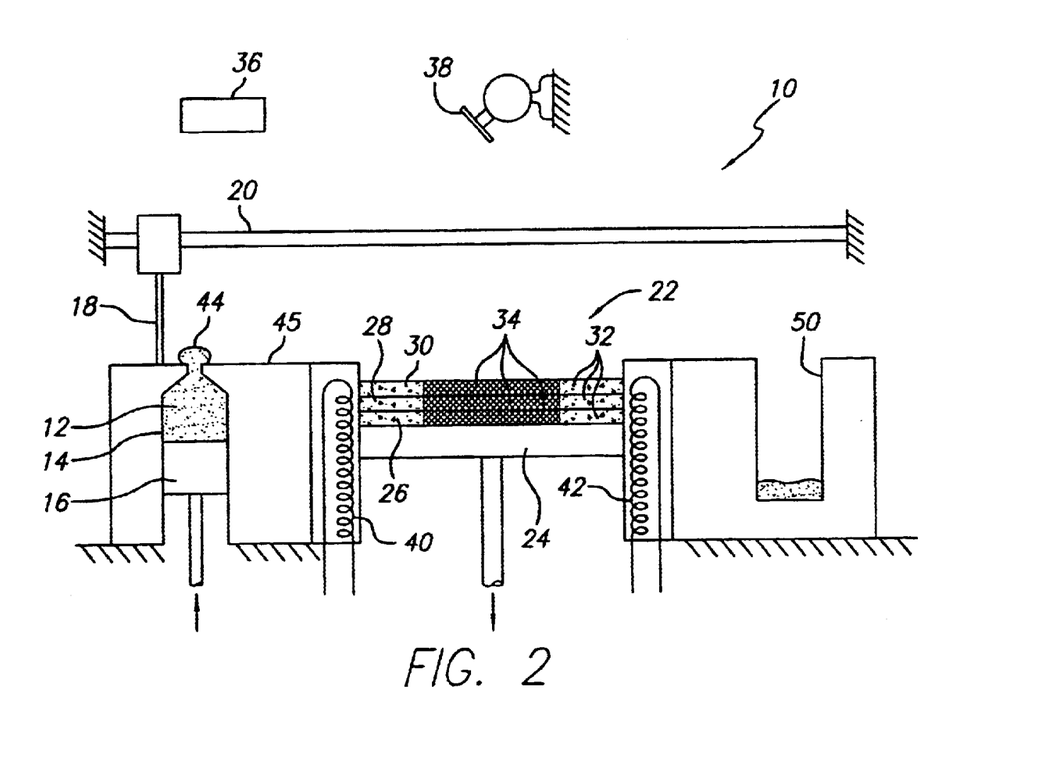
FIGS. 2 through 7 are all diagrammatic side views of the same SFF apparatus for purposes of demonstrating the steps of the present invention recoating system.
Figure 3:
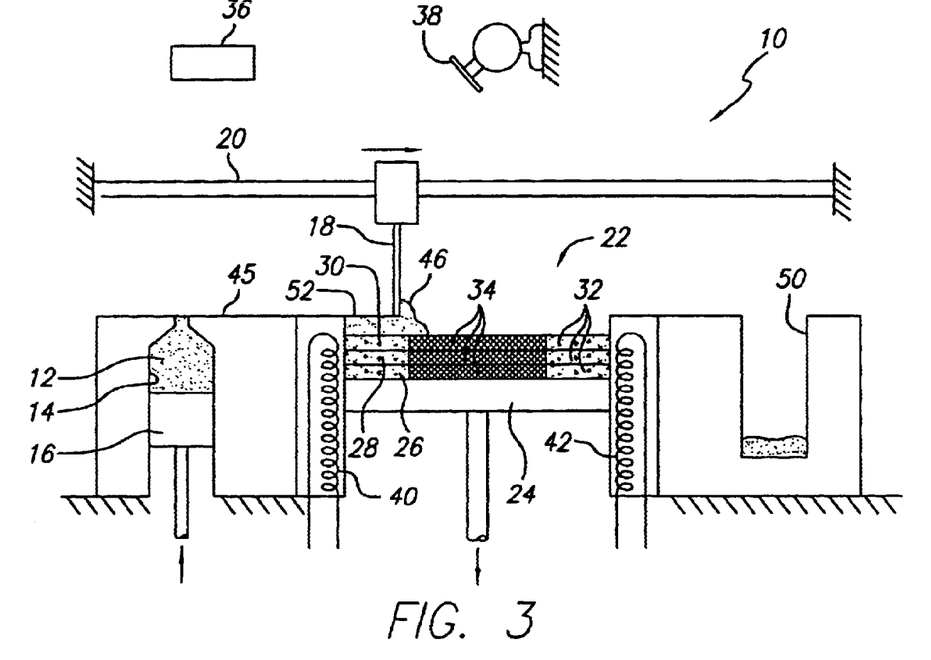

Referring to FIG. 2, the first step carried out by the SFF apparatus of the present invention is shown. In this first step, piston 16 is displaced vertically to dispense a desired amount of viscosity modified build material in the low viscosity state, shown by numeral 44, onto dispensing platform 45. Also at about the same time the platform 24 is lowered one layer thickness in preparation of forming the next layer. Referring to FIG. 3, the next step is shown where the doctor blade 18 is driven to spread the viscosity modified build material, now indicated by numeral 46, on top of layer 30. As used herein, the working surface for the apparatus 10 is the surface on which a new layer of build material is to be placed. In FIG. 3 the exposed or upper facing surface of the top layer 30 is the working surface, however when initially forming an object the first working surface is the upper surface of the build platform 24. Because the viscosity of the build material in the first phase state is substantially less than that of the second and third phase states, insufficient shear stress is induced by the doctor blade 18 when spreading the material to significantly disturb the build material in the adjacent layer 30. Uniquely, this solves a significant problem in the prior art of achieving thin uniform layers of highly viscous build materials without causing de-lamination between layers, missing portions of layers, or uneven coating of layers. These problems are caused by the undesirable transfer of shear stress through the layers as they are applied, which can be acute when layers are formed over solid portions which undesirably produce leading edge bulges and/or trapped volume scoop out or build up problems. Uniquely it has been discovered that all of these problems can be effectively eliminated by applying a layer of a low viscosity medium over a layer of a much higher viscosity medium, and then to increase the viscosity of the applied material preferably to that of the higher viscosity medium before solidifying the material to form layers of an object. This avoids the problems of applying the material in a high viscosity state in layers, while still taking advantage of the superior properties that can be obtained by solidifying thin layers of high viscosity materials in SFF.

Figure 4:
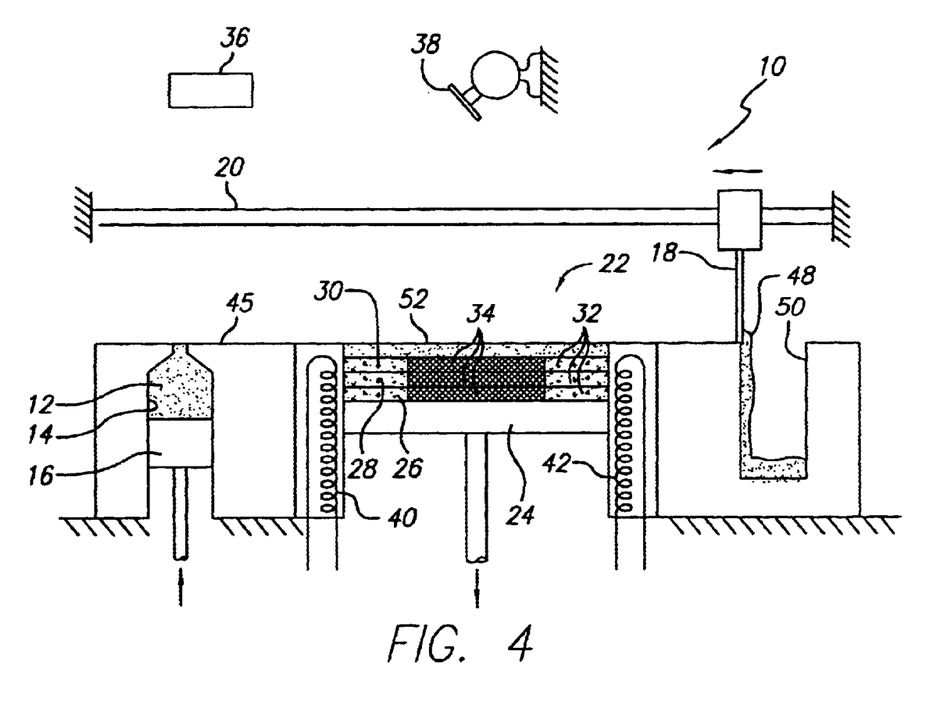

Referring to FIG. 4, the doctor blade 18 is shown having completed its sweep past the staging area 22, where excess build material 48 is delivered to a catch bin 50. This excess build material is preferably recycled but may be discarded, if desired, or may be delivered back to the dispensing container 12 provided a negligible amount of modifier evaporated from the material during the sweep. At this point a newly formed layer of viscosity modified build material is established, as indicated by numeral 52.

Figure 5:
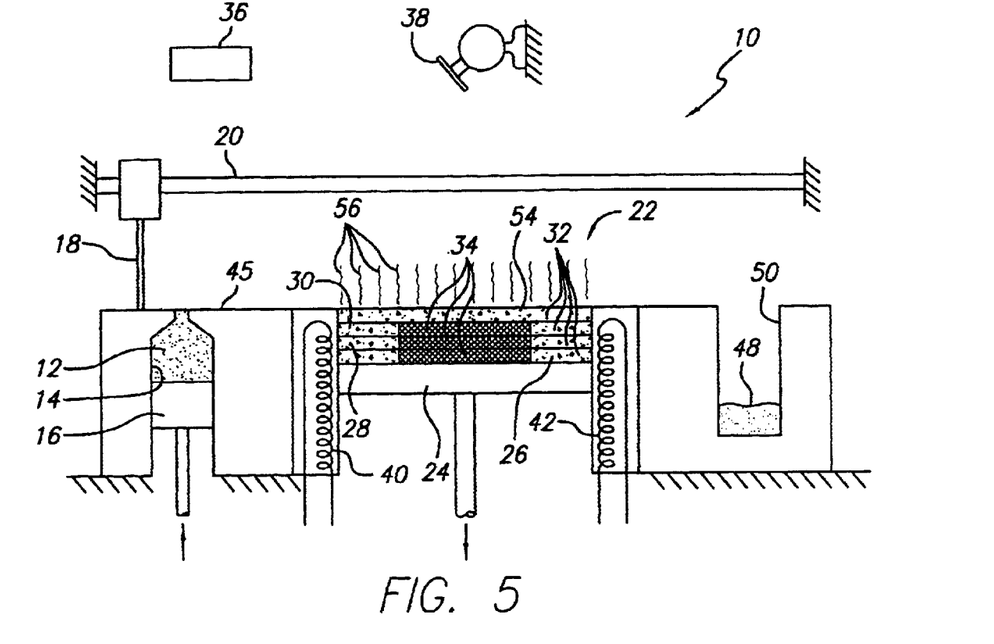

Now referring to FIG. 5, the next step is shown where the modifier is removed from the layer to establish a high viscosity state for the layer of build material. Preferably, the ideal modifier would be one that evaporates relatively quickly at room temperature under atmospheric pressure, and would have a high flash point, although less ideal modifiers may be necessary in order to be compatible with the solid charge or filler materials provided in pastes. In many cases heater units, such as the heated platens shown by numerals 40 and 42, will be needed in order to assist the evaporation process and reduce the time required for the evaporation process to complete. In this case it is also necessary to provide ample insulation between the heated platens and the dispensing container 14 and catch bin 50 to prevent evaporation of the viscosity modifier present in the viscosity modified material 12 and 48. After the evaporation process, which is represented by evaporation lines 56, the layer of build material, now identified by numeral 54, transforms into the second phase state wherein the material is substantially self-supporting. This is desired so that the advantages of utilizing highly viscous build materials previously discussed can be realized upon solidifying the material to form a three-dimensional object. A condenser system can be used to recapture the modifier, if desired, particularly for solvents where it is undesirable to vent them into the atmosphere, and for solvents where it is cost prohibitive to utilize them as consumables. A condenser system may also be desirable particularly when the volume of solvent to be removed is substantial.

Figure 6:
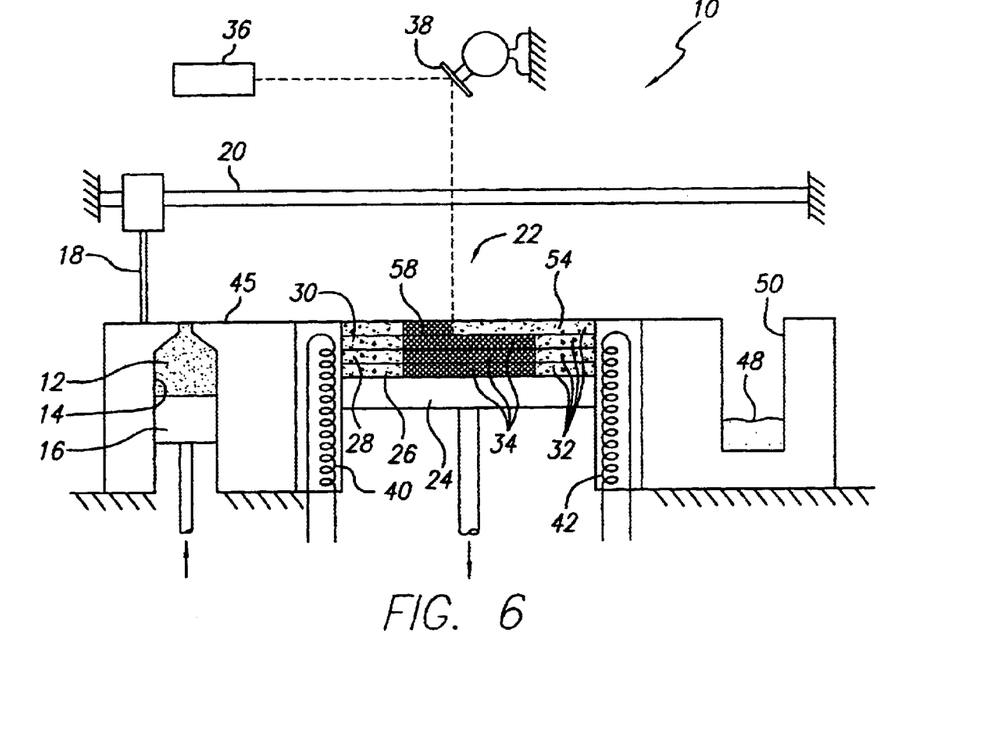
Figure 7:
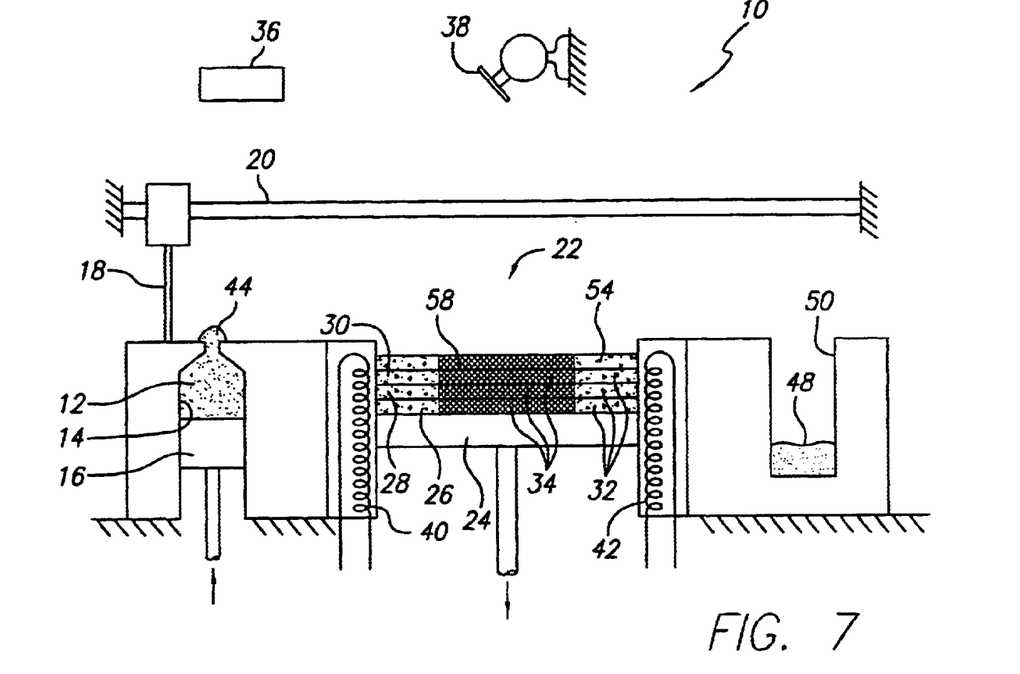

Referring to FIG. 6, the radiation source 36 and scanning mirrors 38 are then activated by the computer controller (not shown) to direct the beam of radiation to selectively solidify the desired portions of the layer, as indicated by numeral 58. In the preferred embodiment the radiation source is a ultraviolet laser which solidifies a photopolymerizable binder material that is present in the build material, although other SFF solidification techniques may be used, if desired. The photopolymerizable binder material may comprise photopolymerizable resins formulated from any combination of acrylates, epoxies, and/or vinyl ethers.

The recoating process discussed in conjunction with the SFF apparatus shown in FIGS. 2 through 7 is summarized as follows:

1) The build platform 24 in the staging area 22 is lowered one layer thickness.
2) The piston 16 vertically displaces the viscosity modified build material, placing the material 44 in front of the doctor blade 18.
3) The doctor blade 18 transports the material and creates a uniform coating of one layer thickness 52 over the build platform or previously formed layer 30.
4) Excess material 48 is collected in container 50.
5) The modifier in the material in the layer 54 is allowed to substantially evaporate.
6) The first layer of the part is imaged to solidify portions of the layer 58.
7) Steps 1) through 6) are repeated until the three-dimensional object is completely built.
8) The platform 24 in the staging area is raised to its starting position and the object, encased in uncured high viscosity material, is removed.
9) The part is removed from the uncured high viscosity material, either manually, or with solvent washing, or with a combination of these methods.

Alternately, two or more layers of viscosity modified build material may be applied to the working surface before a layer is imaged. If done, it is desirable to remove the modifier from each layer prior to applying the next layer. This multiple layering technique may be desirable when initially starting the build process so that the part does not attach to the platform in the staging area.

It should be noted that initially the layers will not be of uniform thickness. As an example, assume that the platform in the staging area is lowered 0.005 inch each time. If the build material has 30% of a solvent modifier, by volume, after the solvent evaporates, the resulting layer will be 30% thinner, or 0.0035 inch. The recoater will deposit more build material during the next cycle, because the platform will displace 0.005 inch, but the resulting distance from the previous layer to the doctor blade will be 0.0065 inch. When the solvent is removed, this layer will be 0.00455 inch thick. During the next cycle, the recoater will deposit an even thicker layer of 0.00695 inch, and when the solvent is removed, this layer will be 0.004865 inch thick. This process will continue, and the layer thickness will asymptotically approach 0.005 inch, and within practical tolerances will be 0.005 inch after a few layers.

It should also be noted that photo-curable binder materials shrink when they are exposed and cured, which is well documented in stereolithography applications utilizing photocurable liquid resins. Because of this, the layer thickness in an exposed and cured region is slightly less than in an unexposed region. The same effect as described above also adds to the thickness of subsequent layers to correct for this. That is, slightly more material will be deposited in the region of shrinkage.

It should also be noted that there are mechanical and other inaccuracies in the recoating process, such that the amount of material deposited across the complete staging area is not absolutely uniform. The doctor blade might not be straight and flat, or the tracks that it is transported on might not be flat and parallel to the face of the platform in the building area. However, the principle as described above also corrects this, and after several layers, the layers will be uniformly thick and flat. Additionally, variations in the amount of modifier in the material over time, and from run to run, will also be compensated for automatically by the principle discussed above.

In an alternative embodiment, a second dispensing means, such as a piston, can be utilize inboard of the catch bin 50 so that the doctor blade 18 operates bidirectionally to distribute build material in both directions and reduce the time required to accomplish recoating. In this configuration, a second catch bin would be employed outboard of piston 16 to receive excess build material on the return sweep.

In another embodiment, the collection container 50 can be replaced with a second build material dispensing container and piston in order to position fresh material in front of the doctor blade during its return sweep. In this embodiment, the excess material from the first recoating cycle can be left directly over the second build material dispensing container, and the doctor blade can be raised over the excess material and position for the return sweep, thereby substantially eliminating the need for the catch bin. Additional viscosity modified build material may then be added to the excess material left above, and the doctor blade can then be swept back to its original position. The process is repeated, with the two containers alternating between dispensing and receiving material.

In another embodiment briefly mentioned above, a pump or other conveyance means may be used to return the material from the collection container 50 back to the dispensing container 14. In this case, the doctor blade would be retracted back to its original position, and therefore would coat in only one direction.

In all of the embodiments discussed herein, the amount of viscosity modifier in the build material in the container may become unknown over time, due to evaporation and other process variations. A sensor or other level sensing means may be needed to determine the material level in the container 14. For example, a capacitance sensor could be used to detect the presence of build material (or lack thereof at some level in the container as the piston moves up and down, and the position where the sensor detects the transition between the material/no material condition that can be set and used by the system as a reference point.

Although a sensor may be used to determine the level of the build material in the container as a result of evaporation over time, it may also be necessary to monitor the concentration of viscosity modifier in the build material. For example, it may be desirable to monitor the viscosity of this material, or a change in volume or other property, and periodically add more viscosity modifier as required to maintain the material in the low viscosity state.

In yet another embodiment two or more materials may be dispensed by the recoating system. In this embodiment, multiple reservoirs containing different viscosity reduced materials may be selectively used by the SFF apparatus. A reservoir not in use may be temporarily capped with a lid so that if the doctor blade transports a different material over that reservoir it won't enter it. There may also be multiple material collection containers, which may also be temporarily capped with lids so they don't collect improper material. One application of dispensing multiple layers of different materials is to make three-dimensional parts with interleaved layers of highly filled metal and highly filled ceramic, which are subsequently fired in a furnace to produce composite parts with interleaved layers of metal and ceramic. Another application is to make a three-dimensional object that is first made of one material which then transitions into another material. For example, the transition might be from ceramic to metal, or possibly from a stiff plastic to a flexible plastic, if desired.

It should be noted that in the embodiments discussed so far that the transformation from the low viscosity state to the high viscosity state need not be of an amount sufficient such that the build material in the layer becomes substantially self-supporting, but may be, if desired. This is because, as the three-dimensional object is built, the build platform 24 is lowered thereby providing structural containment for the three-dimensional object and the adjacent un-solidified build material. In this apparatus configuration, the transformation may simply be of an amount sufficient that when applying another layer of the build material in the low viscosity state over the layer of build material in the high viscosity state, the transference of shear stress to the layer of build material in the high viscosity state is substantially prevented. As a general rule, this may be accomplished by transforming the build material such that the first viscosity value of the build material in the low viscosity state is at least less than about one-half of the second viscosity value of the build material in the high viscosity state. Although the point where the transference of shear stress is substantially prevented is dependent on the relative viscosity values between the low and high viscosity states of the build material, the point can be observed when the application of a new coat of low viscosity build material does not disturb the lower layer of high viscosity build material. Thus, the point allows the layer of high viscosity build material to remain substantially stationary as new layers of low viscosity build material are applied. Optimally, the second viscosity value should be as high as possible for a given build material formulation in order to take advantage of the enhanced mechanical properties that can be achieved when solidifying high viscosity materials.

Figure 1:
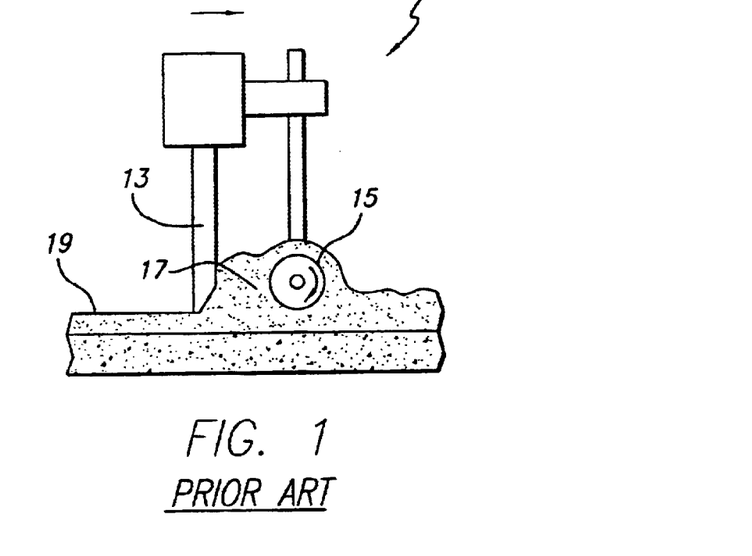
FIG. 1 is diagrammatic side view of a prior art recoating applicator that induces shear stress on a paste material in order to dispense the paste in a uniform layer.

Referring to FIG. 1, a prior art shear inducing applicator is shown generally by numeral 11 which is similar to the applicator disclosed in publication WO 00/51809. The prior art applicator 11 has a doctor blade 13 in close proximity to shear inducing rollers 15. As the rollers 15 rotate, shear stress is induced on the high viscosity build material 17 causing the material to flow. This allows the doctor blade 13 to sweep a uniform layer of build material 19. However, the proper speed of rotation of the rollers 15 and the proper distance between the rollers 15 and the doctor blade 13 are parameters that are critical in order to form a uniform layer by the shear inducing applicator. These parameters are dependent on the characteristics of the high viscosity material being coated. Undesirably, selecting the correct values for these parameters for a particular material is accomplished by trial and error. In addition, since over time the viscosity of a particular material may vary, these values may need to be constantly adjusted in order to continually produce uniform layers. Thus, applicators that function by inducing shear stress on highly viscous build materials to dispense the material in a uniform layer are undesirably sensitive to viscosity changes of the material and therefor do not operate properly in all circumstances.

Figure 8:
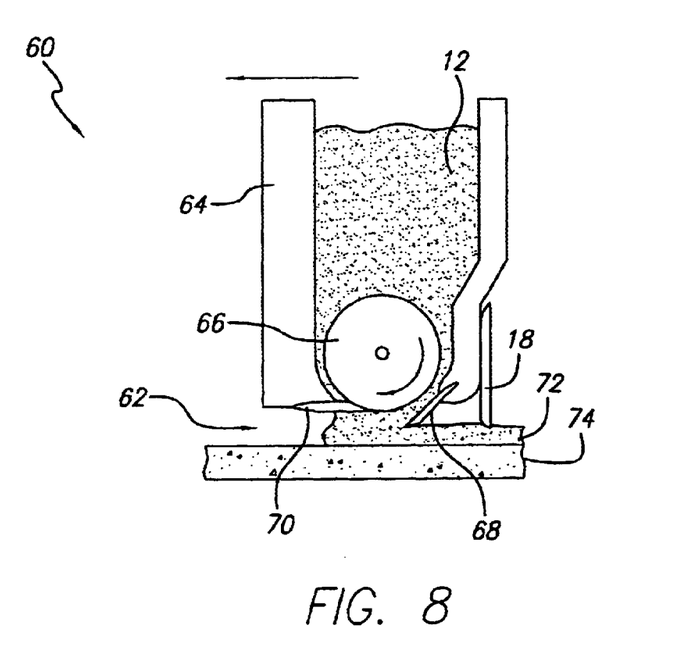
FIG. 8 is diagrammatic side view of a recoating applicator for use in practicing the present invention.

Referring to FIG. 8, an alternative embodiment of a recoating applicator for applying the viscosity modified build material according to the present invention is generally shown by numeral 60. In this embodiment, the viscosity modified build material 12 is provided in a container 64 such that it is gravity fed to the dispensing area generally shown by numeral 62. The recoating applicator 60 includes a distribution roller 66, a dispensing guide blade 68, a skive 70, and a doctor blade 18. Preferably, the surface tension of the viscosity modified build material 12 and gap between the roller 66 and blade 68 are sufficiently matched such that the build material does not dispense when the distribution roller 66 is stationary. Thus, it is desirable to regulate the distribution of the viscosity modified build material by the speed of the roller 66. The skive 70 prevents the dispensed build material from adhering to the roller 66 and returning to the container, and the doctor blade 18 provides the final sweep to form a uniform layer of viscosity modified build material 72 over a previous layer 74. This gravity feed configuration is preferable over the previous embodiments particularly where the viscosity modified build material exhibits non-thixotropic like characteristics such as that of a liquid. This is because it has been found that gravity fed recoater systems can form thin uniform layers with liquids without causing undesirable ripples or waves in the layers as can occur when using smoothing members to skive the liquid over a surface. In this embodiment, however, it is preferred that the transformation from the low viscosity state to the high viscosity state at least be of an amount sufficient such that the build material in the layer becomes substantially self-supporting such as a gel in a thixotropic state. This would particularly be preferred if the recoating applicator were used in conjunction with a build platform that does not have containment walls to prevent the applied layers from running off the build platform. However, the transformation may be of a greater amount, which may be the condition where the first viscosity value of the build material in the low viscosity state is at least less than about one-half of the second viscosity value of the build material in the high viscosity state. Also, the transformation may also be of a greater amount such as the condition where the transference of shear stress to the layer of build material in the high viscosity state when applying a new layer of build material in the low viscosity state is substantially prevented.

It is to be appreciated that any one of the embodiments discussed above may be adapted to apply uniform layers of different build material formulations in any SFF process to produce, for example, laminated three-dimensional objects. Such laminated objects may have different mechanical properties between the laminations that can be optimally oriented in the object to further improve the overall mechanical properties of the object.

What has been described are preferred embodiments in which modifications and changes may be made without departing from the spirit and scope of the accompanying claims.

What is claimed is:

1. A method of applying a build material in layers in a solid freeform fabrication apparatus, the method comprising the steps of:

a) introducing a viscosity modifier in the build material to establish a low viscosity state having a first viscosity value;

b) applying the build material by the apparatus on a working surface to form a layer of build material while the build material is in the low viscosity state;

c) transforming the layer of build material from the low viscosity state to a high viscosity state by removing the viscosity modifier, the transformation being of an amount sufficient that when applying another layer of the build material late low viscosity state over the layer of build material in the high viscosity state, the transference of shear stress to the layer of build material in the high viscosity state is substantially prevented; and d) solidifying portions of the layer to establish a solidified state of build material forming the layers of the three-dimensional object;

e) repeating steps b) through d) until said three-dimensional object is formed.

2. The method of claim 2 wherein the high viscosity state of the build material has a second viscosity value wherein the first viscosity value of the build material is less than at least one-half of the second viscosity value.

3. The method of claim 1 wherein the step transforming the layer of build material is accomplished by applying thermal heat to remove the viscosity modifier from the layer of build material.

4. The method of claim 1 wherein the viscosity modifier is a solvent and the solvent is removed from the layer of the build material by evaporation.

5. The method of claim 4 wherein the solvent is selected from the group consisting of hydrocarbons, aliphatic hydrocarbons, naphtha, mineral oil, aromatic hydrocarbons, benzcne, toluene, functional aromatics, O-Cresol, halogenated hydrocarbons, chlorinated solvents, carbon tetrachioride, carbon dioxide, freon, methylene chloride, monohydric alcohols, polyhydric alcohols, phenols, ethers, tetrahydrotbran, glycol ethers. ketones, acetone, cyclohexanone, acetophenone, amines, n-Butylamine, N,N-Dimethylaniline, acids, chromic acids, nitric acids, phosphoric acids, inorganics, water, silicon tetrachloride, phosphoric trichloride, esters, N-Butyl acetate, ethyl acetate, nitrogen-containing compounds, nitrates, nitriles, organic sulfur compounds, acids/aldehydes, acetic acid, trichloroacetic acid, hydroxide bases, ammonium hydroxide, sodium hydroxide, peroxides, hydrogen peroxide, and combinations thereof.

6. The method of claim 2 wherein in transforming the layer of build material from the low viscosity state to the high viscosity state, the second viscosity value of the build material is raised at least to a point where the build material in the layer is substantially self-supporting.

7. The method of claim 2 wherein the build material in the high viscosity state is a liquid, a semi-solid, a gel, a foam, or a paste, and the second viscosity value of the high viscosity state is greater than at least about 10,000 centipoise at ambient conditions.

8. The method of claim 7 wherein the high viscosity state build material is a photopolymerizable resin.

9. The method of claim 8 wherein the photoplymerizable resin is selected from a photopolyrner based group consisting of acrylates, epoxies, vinyl ethers, and combinations thereof.

10. The method of claim 7 wherein the high viscosity state build material is a thermally polymerizable material.

11. The method of claim 10 wherein the thermally polymerizable material includes a peroxide-based thermal initiator.

12. The method of claim 7 wherein the build material comprises a plurality of particulate matter and a bonding agent.

13. The method of claim 12 wherein the particulate matter is a powder comprising any combination of a polymer, mineral, metal, or ceramic.

14. The method of claim 13 wherein the polymer powder is a thermoplastic selected from the group consisting of ABS, Nylon, polypropylene, polycarbonate, polyethersulfate and combinations thereof.

15. The method of claim 13 wherein the metallic powder is selected from the group consisting of steel, steel alloy, stainless steel, aluminum, aluminum alloy, titanium, titanium alloy, copper, tungsten, tungsten carbide, molybdenum, nickel alloy, lanthanum, hafnium, tantalum, rhenium, rubidium, bismuth, cadmium, indium, tin, zinc, cobalt, manganese, chromium, gold, silver, and combinations thereof.

16. The method of claim 13 wherein the ceramic powder is selected from the group consisting of aluminum nitride, aluminum oxide, calcium carbonate, fluoride, magnesium oxide, silicon carbide, silicon dioxide, silicon nitride, titanium carbide, titanium carbonitride, titanium diboride, titanium dioxide, tungsten carbide, tungsten trioxide, zirconia, zinc suphide, and combinations thereof.

17. The method of claim 13 wherein the mineral powder is selected from the group consisting of cerium oxide, dysprosium oxide, erbium oxide, gadolinium oxide, holmium oxide, lutetium oxide, samarium oxide, terbium oxide, yttrium oxide, and combinations thereof.

18. The method of claim 12 wherein the bonding agent comprises a photopolymerizable resin or a thermally polyrnerizable material.

19. The method of claim 18 wherein the photopolymerizable resin is selected from a photopolymer based group consisting of acrylates, epoxies, vinyl ethers, and combinations thereof.

20. The method of claim 18 wherein the thermally polymerizable material includes a peroxide-based thermal initiator.

21. The method of claim 19 wherein the build material further comprises a polymethyl methacrylate tackifier additive.

22. The method of claim 1 wherein the viscosity modifier is introduced in the build material prior to being delivered to the apparatus.

23. A system of applying a build material in layers in a solid freeform fabrication apparatus to form a three-dimensional object, the system comprising:
   means for delivering the build material to the apparatus;
   means for introducing a viscosity modifier in the build material to establish a low viscosity state having a first viscosity value;
   means for applying the build material by the apparatus on a working surface while the build material is in the low viscosity state to form a layer of the build material;
   means for transforming the layer of build material by removing the viscosity modifier from the layer of the build material to establish a high viscosity state for the layer of build material, the removal of the viscosity modifier being of an amount sufficient that when applying another layer of the build material in the low viscosity state over the layer of build material in the high viscosity state, the transference of shear stress to the layer of build mated al in the high viscosity state is substantially prevented; and
   means for solidifying portions of the layer of the build material to establish a solidified state forming the three-dimensional object.

24. The system of claim 23 wherein the high viscosity state of the build material has a second viscosity value wherein the first viscosity value of the build material is at least less than about one-half of the second viscosity value.

25. The system of claim 23 wherein the means for transforming the layer of build material includes a means for thermally heating the layer of build material to remove the viscosity modifier from the layer of build material.

26. The system of claim 23 wherein the viscosity modifier is a solvent removed by evaporation.

27. The system of claim 26 wherein the solvent is selected from the group consisting of hydrocarbons, aliphatic hydrocarbons, naphtha, mineral oil, aromatic hydrocarbons, benzene, toluene, functional aromatics, O-Cresol, halogenated hydrocarbons, chlorinated solvents, carbon tetrachloride, carbon dioxide, freon, methylene chloride, monohydric alcohols, polyhydric alcohols, phenols, ethers, tetrahydrofuran, glycol ethers, ketones, acetone, cyclohexanone, acetophenone, amines, n-Butylamine, N,N-Dimethylaniline, acids, chromic acids, nitric acids, phosphoric acids, inorganics, water, silicon tetrachloride, phosphoric trichloride, esters, N-Butyl acetate, ethyl acetate, nitrogen-containing compounds, nitrates, nitriles, organic sulfur compounds, acids/aldehydes, acetic acid, trichloroactic acid, hydroxide bases, amonium hydroxide, sodium hydroxide, peroxides, hydrogen peroxide, and combinations thereof.

28. The system of claim 23 wherein the means of transforming the layer of build material transforms the layer at least to a point where the build material in the layer is substantially self-supporting.

29. The system of claim 23 wherein the build material in the high viscosity state is a liquid, a semi-solid, a gel, a foam, or a paste, and the second viscosity value of the high viscosity state is greater than at least about 10,000 centipoise at ambient conditions.

30. The system of claim 29 wherein the high viscosity state build material is a photopolymerizable resin or a thermally polymerizable material.

31. The system of claim 30 wherein the photopolymerizable resin is selected from a photopolymer based group consisting of acrylates, epoxies, vinyl ethers, and combinations thereof.

32. The system of claim 29 wherein the build material comprises a plurality of particulate matter and a bonding agent.

33. The system of claim 32 wherein the particulate matter is a powder comprising any combination of a polymer, mineral, metal, or ceramic.

34. The system of claim 33 wherein the polymer powder is selected from the group consisting of thermoplastics, ABS, Nylon, polypropylene, polycarbonate, and polyethersulfate and combinations thereof.

35. The system of claim 33 wherein the metallic powder is selected from the group consisting of steel, steel alloy, stainless steel, aluminum, aluminum alloy, titanium, titanium alloy, copper, tungsten, tungsten carbide, molybdenum, nickel alloy, lanthanum, hafnium, tantalum, rhenium, rubidium, bismuth, cadmium, indium, tin, zinc, cobalt, manganese, chromium, gold, silver, and combinations thereof.

36. The system of claim 33 wherein the ceramic powder is selected from the group consisting of aluminum nitride, aluminum oxide, calcium carbonate, fluoride, magnesium oxide, silicon carbide, silicon dioxide, silicon nitride, titanium carbide, titanium casrbonitride, titanium diboride, titanium dioxide, tungsten carbide, tungsten trioxide, zirconia, zinc sulphide, and combinations thereof.

37. The system of claim 33 wherein the mineral powder is selected from the group consisting of cerium oxide, dysprosium oxide, erbium oxide, gadolinium oxide, holmium oxide, lutetium oxide, samarium oxide, terbium oxide, yttrium oxide, and combinations thereof.

38. The system of claim 32 wherein the bonding agent comprises a photopolymerizable resin or a thermally polymerizable material.

39. The system of claim 38 wherein the photopolymerizable resin is selected from a photopolymer based group consisting of acrylates, epoxies, vinyl ethers, and combinations thereof.

40. The system of claim 39 wherein the build material further comprises a polymethyl methacrylate tackifier additive.

41. The system of claim 23 wherein the means for solidifying portions of the layer of build material is accomplished by exposing the portions of the layer of build material to actinic radiation.

42. The system of claim 30 wherein the thermally polymerizable material includes a peroxide based thermal initiator.

43. The system of claim 38 wherein the thermally polymerizable material includes a peroxide based thermal initiator.

44. A solid freeform apparatus for forming a three-dimensional object from a build material in a plurality of layers, the apparatus comprising:
  means for dispensing the build material to form a layer of build material on a working surface while the build material is in a low viscosity state;
  means for transforming the layer of the build material to a high viscosity state, the transformation being of an amount sufficient that when applying another layer of the build material in the low viscosity state over the layer of build material in the high viscosity state, the transference of shear stress to the layer of build material in the high viscosity state is substantially prevented; and
  means for solidifying portions of the layer of the build material to establish a solidified state by selectively exposing the portions of the layer of the build material to radiation.

45. The apparatus of claim 44 further comprising:
  means for introducing a viscosity modifier in the build material to establish the low viscosity state having a first viscosity value, the high viscosity state having a second viscosity value and wherein the first viscosity value of the build material is at least less than about one-half of the second viscosity value.

46. The apparatus of claim 45 wherein the means for dispensing the build material comprises at least one smoothing member and the means for removing the viscosity modifier comprises at least one heater for evaporating the viscosity modifier.

47. The apparatus of claim 45 wherein the means for dispensing the build material comprises at least one gravity fed recoating applicator.

48. The apparatus of claim 47 wherein the gravity fed recoating applicator comprises a container for holding the build material, a distribution roller adjacent the container, a skive adjacent the distribution roller, and a smoothing member adjacent the distribution roller, the distribution roller and container being positioned so as to establish a dispensing orifice wherein build material is dispensed through the dispensing orifice when the distribution roller rotates.

49. The apparatus of claim 44 further comprising two or more means for dispensing the build material, each means for dispensing the build material adapted to dispense a different formulation of build material.

50. A method of building a three-dimensional object in a solid freeform fabrication apparatus in layerwise fashion, the method comprising the steps of:
  a) retaining at least one build material containing a viscosity modifier in the apparatus, the build material being in a low viscosity state;
  b) applying the build material to a working surface to form a layer of the build material while the build material is in the low viscosity state;
  c) transforming the layer of build material from the low viscosity state to a high viscosity state by removing the viscosity modifier from the layer of the build material, the transformation being of an amount sufficient that when applying another layer of the build material in the low viscosity state over the layer of build material in the high viscosity state, the transference of shear stress to the layer of build material in the high viscosity state is substantially prevented; and d) solidifying at least a portion of the applied layer of the build material establishing a solidified state of the build material;

e) repeating steps b) through d) until the three-dimensional object is formed.

51. The method of claim 50 further comprising the step of:

f) separating the solidified three-dimensional object from un-solidified build material in the high viscosity state.

52. The method of claim 50 wherein more than one build material formulation is applied to form the three-dimensional object.

53. The method of claim 50 wherein the high viscosity state of the build material has a second viscosity value wherein the first viscosity value of the build material is less than at least one-half of the second viscosity value.

54. The method of claim 50 wherein the step of transforming the layer of build material is accomplished by applying heat to remove the viscosity modifier from the layer of build material.

55. The method of claim 54 wherein the viscosity modifier is a solvent removed by evaporation.

56. The method of claim 55 wherein the solvent is selected from the group consisting of hydrocarbons, aliphatic hydrocarbons, naphtha, mineral oil, aromatic hydrocarbons. benzene, toluene, functional aromatics, O-Cresol, halogenated hydrocarbons, chlorinated solvents, carbon tetrachloride, carbon dioxide, freon, methylene chloride, monohydric alcohols, polyhydric alcohols, phenols, ethers, tetrahydrofuran, glycol ethers, ketones, acetone, cyclohexanone, acetophenone, amines, n-Butylamine, N,N-Dimethylaniline, acids, chromic acids, nitric acids, phosphoric acids, inorganics, water, silicon tetrachloride, phosphoric trichloride, esters, N-Butyl acetate, ethyl acetate, nitrogen-containing compounds, nitrates, nitriles, organic sulfur compounds, acids/aldehydes, acetic acid, trichloroactic acid, hydroxide bases, ammonium hydroxide, sodium hydroxide, peroxides, hydrogen peroxide, and combinations thereof.

57. The method of claim 53 wherein in transforming the layer of build material from the low viscosity state to the high viscosity state, the second viscosity value of the build material is raised at least to a point where the build material in the layer is substantially self-supporting.

58. The method of claim 53 wherein the build material in the high viscosity state is a liquid, a semi-solid, a gel, a foam, or a paste, and the second viscosity value of the high viscosity state is greater than at least about 10,000 centipoise at ambient conditions.

59. The method of claim 58 wherein the high viscosity state build material is a photopolymerizable resin or a thermally polymerizable material.

60. The method of claim 59 wherein the photopolymerizable resin is selected from a photopolymer based group consisting of acrylates, epoxies, vinyl ethers, and combinations thereof.

61. The method of claim 60 wherein the build material further comprises a polymethyl methacrylate tackifier additive.

62. The method of claim 58 wherein the build material comprises a plurality of particulate matter and a bonding agent.

63. The method of claim 62 wherein the particulate matter is a powder comprising any combination of a polymer, mineral, metal, or ceramic.

64. The method of claim 63 wherein the polymer powder is a thermoplastic selected from the group consisting of ABS, Nylon, polypropylene, polycarbonate, and polyethersulfate and combinations thereof.

65. The method of claim 63 wherein the metallic powder is selected from the group consisting of steel, steel alloy, stainless steel, aluminum, aluminum alloy, titanium, titanium alloy, copper, tungsten, tungsten carbide, molybdenum, nickel alloy, lanthanum, hafnium, tantalum, rhenium, rubidium, bismuth, cadmium, indium, tin, zinc, cobalt, manganese. chromium, gold, silver, and combinations thereof.

66. The method of claim 63 wherein the ceramic powder is selected from the group consisting of aluminum nitride, aluminum oxide, calcium carbonate, fluoride, magnesium oxide, silicon carbide, silicon dioxide, silicon nitride, titanium carbide, titanium carbonitride, titanium diboride, titanium dioxide, tungsten carbide, tungsten trioxide, zirconia, zinc sulphide, and combinations thereof.

67. The method of claim 63 wherein the mineral powder is selected from the group consisting of cerium oxide, dysprosium oxide, erbium oxide, gadolinium oxide, holmium oxide, lutetium oxide, samarium oxide, terbium oxide, yttrium oxide, and combinations thereof.

68. The method of claim 62 wherein the bonding agent comprises a photopolymerizable resin.

69. The method of claim 68 wherein the photopolymerizable resin is selected from a phoropolymer based group consisting of acrylates, epoxies, vinyl ethers, and combinations thereof.

70. The method of claim 50 wherein the step of solidifying portions of the layer of build material is accomplished by exposing the portions of the layer of build material to actinic radiation.

71. The method of claim 50 wherein the step of applying the build material comprises spreading the build material along the working surface with at least one smoothing member.

72. The method of claim 62 wherein the bonding agent is a thermally polymerizable material.

73. The method of claim 72 wherein the step of solidifying portions of the layer of build material is accomplished by exposing the portions of the layer of build material to infra-red radiation.

74. The method of claim 59 wherein the thermally polymerizable material includes a peroxide based thermal initiator.

75. The method of claim 72 wherein the thermally polymerizable material includes a peroxide based thermal initiator.

76. A method of forming a three-dimensional object from a build material in a layer wise fashion by solid freeform fabrication, the method comprising the steps of:

a) applying the build material on a working surface to form a layer of build material while the build material is in a low viscosity state;

b) transforming the layer of build material from the low viscosity state to a high viscosity state, the transformation being of an amount sufficient that when applying another layer of the build material in the low viscosity state over the layer of build material in the high viscosity state, the transference of shear stress to the layer of build material in the high viscosity state is substantially prevented;

c) solidifying portions of the layer of build material in the high viscosity state to establish a solidified state of the build material forming the three-dimensional object;

d) repeating steps a) through c) until said three-dimensional object is formed.

77. The method of claim 76 wherein the high viscosity state of the build material has a second viscosity value wherein the first viscosity value of the build material is less than at least one-half of the second viscosity value.

78. The method of claim 77 wherein a viscosity modifier is present in the layer of build material applied in the low viscosity state, and the step of transforming the layer of build material is accomplished by applying thermal heat to remove the viscosity modifier from the layer of build material.

79. The method of claim 78 wherein the viscosity modifier is a solvent removed by evaporation.

80. The method of claim 79 wherein the solvent is selected from the group consisting of hydrocarbons, aliphatic hydrocarbons, naphtha, mineral oil, aromatic hydrocarbons, benzene, toluene, functional aromatics, O-Cresol, halogenated hydrocarbons, chlorinated solvents, carbon tetrachloride, carbon dioxide, freon, methylene chloride, monohydric alcohols, polyhydric alcohols, phenols, ethers, tetrahydrofuran, glycol ethers, ketones, acetone, cyclohexanone, acetophenone, amines, n-Butylamine, N,N-Dimethylaniline, acids, chromic acids, nitric acids, phosphoric acids, inorganics, water, silicon tetrachloride, phosphoric trichloride, esters, N-Butyl acetate, ethyl acetate, nitrogen-containing compounds, nitrates, nitriles, organic sulfur compounds, acids/aldehydes, acetic acid, trichloroactic acid, hydroxide bases, ammonium hydroxide, sodium hydroxide, peroxides, hydrogen peroxide, and combinations thereof.

81. The method of claim 77 wherein in transforming the layer of build material from the low viscosity state to the high viscosity state, the second viscosity value of the build material is raised at least to a point where the build material in the layer is substantially self-supporting.

82. The method of claim 77 wherein the build material in the high viscosity state is a liquid, a semi-solid, a gel, a foam, or a paste, and the second viscosity value of the high viscosity state is greater than at least about 10,000 centipoise at ambient conditions.

83. The method of claim 82 wherein the high viscosity state build material is a photopolymerizable resin or a thermally polymerizable material.

84. The method of claim 83 wherein the photopolymerizable resin is selected from a photopolymer based group consisting of acrylates, epoxies, vinyl ethers, and combinations thereof.

85. The method of claim 84 wherein the build material further comprises a polymethyl methacrylate tackifier additive.

86. The method of claim 82 wherein the build material comprises a plurality of particulate matter and a bonding agent.

87. The method of claim 86 wherein the particulate matter is a powder comprising any combination of a polymer, mineral, metal, or ceramic.

88. The method of claim 87 wherein the polymer powder is a thermoplastic selected from the group consisting of ABS, Nylon, polypropylene, polycarbonate, polyethersulfate and combinations thereof.

89. The method of claim 87 wherein the metallic powder is selected from the group consisting of steel, steel alloy, stainless steel, aluminum, aluminum alloy, titanium, titanium alloy, copper, tungsten, tungsten carbide, molybdenum, nickel alloy, lanthanum, hafnium, tantalum, rhenium, rubidium, bismuth, cadmium, indium, tin, zinc, cobalt, manganese, chromium, gold, silver, and combinations thereof.

90. The method of claim 87 wherein the ceramic powder is selected from the group consisting of aluminum nitride, aluminum oxide, calcium carbonate, fluoride, magnesium oxide, silicon carbide, silicon dioxide, silicon nitride, titanium carbide, titanium carbonitride, titanium diboride, titanium dioxide, tungsten carbide, tungsten trioxicle, zirconia, zinc sulphide, and combinations thereof.

91. The method of claim 87 wherein the mineral powder is selected from the group consisting of cerium oxide, dysprosium oxide, erbium oxide, gadolinium oxide, holmium oxide, lutetium oxide, samarium oxide, terbium oxide, yttrium oxide, and combinations thereof.

92. The method of claim 86 wherein the bonding agent comprises a photopolymerizable resin.

93. The method of claim 92 wherein the bonding agent comprises a photopolymerizable resin or a thermally polymerizable material.

94. The method of claim 93 wherein the photopolymerizable resin is selected from a photopolymer based group consisting of acrylates, epoxies, vinyl ethers, and combinations thereof.

95. The method of claim 76 wherein the step of solidifying portions of the layer of build material is accomplished by exposing the portions of the layer of build material to actinic radiation.

96. The method of claim 93 wherein the thermally polymerizable material includes a peroxide based thermal initiator.

* * * * *